(12) United States Patent
Bainter

(10) Patent No.: US 6,311,952 B2
(45) Date of Patent: Nov. 6, 2001

(54) HYDRAULIC GRAIN STORAGE BIN LIFTING SYSTEM AND METHOD

(76) Inventor: Wesley Allen Bainter, P.O. Box 705, Hoxie, KS (US) 67740

( * ) Notice: Subject to any disclaimer, the term of this patent is extended or adjusted under 35 U.S.C. 154(b) by 0 days.

(21) Appl. No.: 09/851,683

(22) Filed: May 8, 2001

Related U.S. Application Data

(62) Division of application No. 09/536,938, filed on Mar. 28, 2000.
(60) Provisional application No. 60/131,637, filed on Apr. 28, 1999.

(51) Int. Cl.[7] .................................................. B66F 7/12
(52) U.S. Cl. ........................ 254/89 H; 251/1; 251/93 HP
(58) Field of Search ........................... 254/1, 89 H, 89 R, 254/93 H, 93, 93 R, 105, 108, 109, 110, 111

(56) References Cited

U.S. PATENT DOCUMENTS

| | | | |
|---|---|---|---|
| 3,073,573 | * | 1/1963 | Haskins .............................. 254/89 H |
| 3,131,908 | * | 5/1964 | Payton ................................ 254/89 H |
| 3,182,958 | * | 5/1965 | Peterzon-Arbella ............... 254/89 H |
| 3,235,956 | * | 2/1966 | Heathcote .......................... 254/89 H |
| 3,858,688 | * | 1/1975 | Galloway ........................... 254/89 H |
| 3,881,687 | * | 5/1975 | Johansson .......................... 254/89 H |
| 3,955,797 | * | 5/1976 | Richards ............................ 254/89 H |
| 4,807,851 | * | 2/1989 | DeCastro ................................ 254/1 |
| 5,232,202 | * | 8/1993 | Watson .................................... 254/1 |
| 5,397,103 | * | 3/1995 | Watson .................................... 254/1 |
| 5,868,544 | * | 2/1999 | Cox .................................... 254/89 H |

\* cited by examiner

*Primary Examiner*—Joseph J. Hail, III
*Assistant Examiner*—Daniel Shanley
(74) *Attorney, Agent, or Firm*—Robert Blinn

(57) ABSTRACT

The present invention is a method for constructing cylindrical grain bins. The method employs a sets of identical, telescoping jacks actuated by hydraulic cylinders and an hydraulic system having separate hydraulic circuits that serve each set of jacks. Using the set of identical, hydraulic, telescoping jacks, successive rings of a grain bin structure made up of connected panels are lifted. After a first ring is lifted, a second ring can be attached to the lower edge of the first ring. The second ring is then lifted and the process is repeated until the grain bin is completed.

5 Claims, 4 Drawing Sheets

HYDRAULIC GRAIN STORAGE BIN LIFTING SYSTEM AND METHOD

CROSS REFERENCES TO RELATED APPLICATIONS

This application is a divisional of U.S. Regular Utility patent application Ser. No. 09/536,938 filed Mar. 28, 2000.

U.S. Regular Utility patent application Ser. No. 09/536,938 claimed the benefit of U.S. Provisional Patent Application No. 60/131,637 filed Apr. 28, 1999.

BACKGROUND OF THE INVENTION

1. Field of the Invention

The present invention relates to a method and apparatus for lifting successive rings of corrugated steel panels to construct cylindrical grain bins.

2. Background of the Invention

Modem grain bins typically have cylindrical steel walls and conical steel roofs assembled from prefabricated components. The cylindrical steel wall of a modem grain bin is fashioned from curved steel panels having horizontal corrugations. Bolt holes are located about the edges of the curved steel panels so that panels can be fastened to the lower edge of an assembled roof and to each other in successive rings to complete a bin. Accordingly, the present method for assembling a grain bin generally includes the following steps: (a) laying a concrete foundation, (b) constructing a circular roof, (c) lifting the roof, (c) attaching a first ring of panels, (d) raising the roof and the first ring of panels, (e) attaching a second ring of panels to the first ring, and (f) attaching successive rings of panels to complete the bin.

Although the process for building a grain bin may seem simple, building a grain bin using present methods is really quite difficult and labor intensive. The most difficult part of bin construction is raising the successive circular rings of panels so that all parts of the structure stay level and lift at the same rate. If this is not done properly, parts of the structure will be overloaded and will fail. One bin raising method is to attach a pattern of jacks around the wall of the grain bin and carefully operate those jacks to incrementally raise each portion of the grain bin wall. In order to not over-stress the wall panels, all the jacks must be operated in small increments or simultaneously. Such incremental operations or simultaneous manual operations require significant labor. Another method for lifting a grain bin includes the use of an overhead crane. This method is difficult because a single point suspension of a large grain bin is inherently unstable. A multi-point suspension of a large grain bin is subject to the same difficulties as a multi-point jacking operation.

The difficulty encountered by those constructing grain bins is further aggravated by the continuing shortage of labor in rural areas. In the United States, at the beginning of the twentieth century, large numbers of workers could be found in rural areas. Today, at the beginning of the twenty first century, rural areas in the United States are depleted of labor and increasing levels of mechanization and even automation are evident in farming operations and related activities. Still further, an increasing demand for grain bins is evident in rural areas because increasingly larger, mechanized farming operations have opted to rely on their own storage facilities as a way to cope with fluctuations in grain prices. Consequently, there has been a long felt and now an urgent need for a grain bin lifting system that will permit operators to construct a grain bin with a minimum of labor.

SUMMARY OF THE INVENTION

The bin lifting system of the present invention satisfies this long felt need by providing a safe and reliable way to raise a grain bin with significantly less labor. The bin lifting system includes identical positive displacement pumps, a power source for driving the pumps, a reservoir for storing hydraulic fluid, hydraulic cylinder actuated jacks that attach to and lift the bin structure, control valves for controlling the flow of hydraulic fluid between the pumps, the jacks and the reservoir and hydraulic lines for conveying hydraulic fluid between the pumps, the jacks and the reservoir. The hydraulic cylinders for actuating the jacks include an upper chamber and a lower chamber. A sliding piston separates the upper and lower chambers. The piston carries a piston rod that extends up through the hydraulic cylinder. The hydraulic pumps are driven by the power source at the same rate so that they each provide equal volumes of hydraulic fluid to one of the control valves. The control valves are used to control the movements of sets of jacks having at least one jack or as many as sixteen jacks. When controlling one jack, each one of the control valves can be moved between three positions: (a) a first, neutral position where the valve directs fluid from a pump back toward the reservoir, (b) a second, lift position where the valve directs fluid from the pump toward the lower chamber of the hydraulic cylinder and also directs fluid from the upper chamber of the hydraulic cylinder toward the reservoir to cause the piston and piston rod to rise and (c) a third, descent position where the valve directs fluid from the pump toward the upper chamber of the hydraulic cylinder and also directs fluid from the lower chamber of the hydraulic cylinder toward the reservoir to cause the piston and piston rod to lower. By using line splitters, each control valve can be connected a set of jacks having more than one jack as long as all the sets have equal numbers of jacks. To allow simultaneous operation of all of the sets of jacks, the control valves can be mechanically interconnected so that they all can be moved in unison. This results in a hydraulic system having a number of separate circuits that can be controlled as one unit by one operator who can now raise or even lower a large number of jacks in unison.

The jacks used in the present invention are substantially identical and include a series of successive telescoping masts. The series of successive telescoping masts includes a first mast, at least one next mast and a base mast.

The first mast has a fixed member that engages the piston rod of the hydraulic cylinder as well as a bracket for attachment to the structure being lifted. The next mast has members for holding a removable bracket. Like the fixed member of the first mast, the removable bracket engages the piston rod of the hydraulic cylinder. The base mast is supported by legs and holds the hydraulic cylinder in place. All of the masts except the base mast have holes that receive pins so that when pinned they can be secured in an extended position.

Each jacks is capable of lifting a structure by a distance greater than the stroke distance of its hydraulic cylinder because its telescoping masts can be lifted and secured successively. First, the first mast is attached to the structure by its bracket. After the first mast is lifted by the extending hydraulic piston, it is secured by a pin in relation to the next mast. The piston is retracted, and the removable bracket is placed on the next mast so that it can be lifted and secured by a pin. Each successive mast is then lifted so that the structure can be lifted by a distance much greater than the stroke of the hydraulic cylinder. The jacks raise the structure uniformly because the hydraulic pumps supply equal volumes of hydraulic fluid to the control valves and the identical hydraulic cylinders of each jack. A reverse lowering operation can be accomplished by sending hydraulic fluid to the upper chambers of the hydraulic cylinders and successively retracting the pistons and the masts. If needle valves are placed in the hydraulic lines leading to the lower chambers of each hydraulic cylinder, then fluid leaving the lower chambers of the hydraulic cylinders in a descent operation can be restricted and controlled thereby preventing the structure from descending too rapidly. When jacks of the present invention are used in combination with the above described hydraulic system, a large structure comprised of relatively wide panels can be raised by employing a series of simple, repetitive steps.

BRIEF DESCRIPTION OF THE DRAWINGS

The following detailed description refers to the attached drawings in which.

DETAILED DESCRIPTION OF PREFERRED EMBODIMENT

Figure 1:
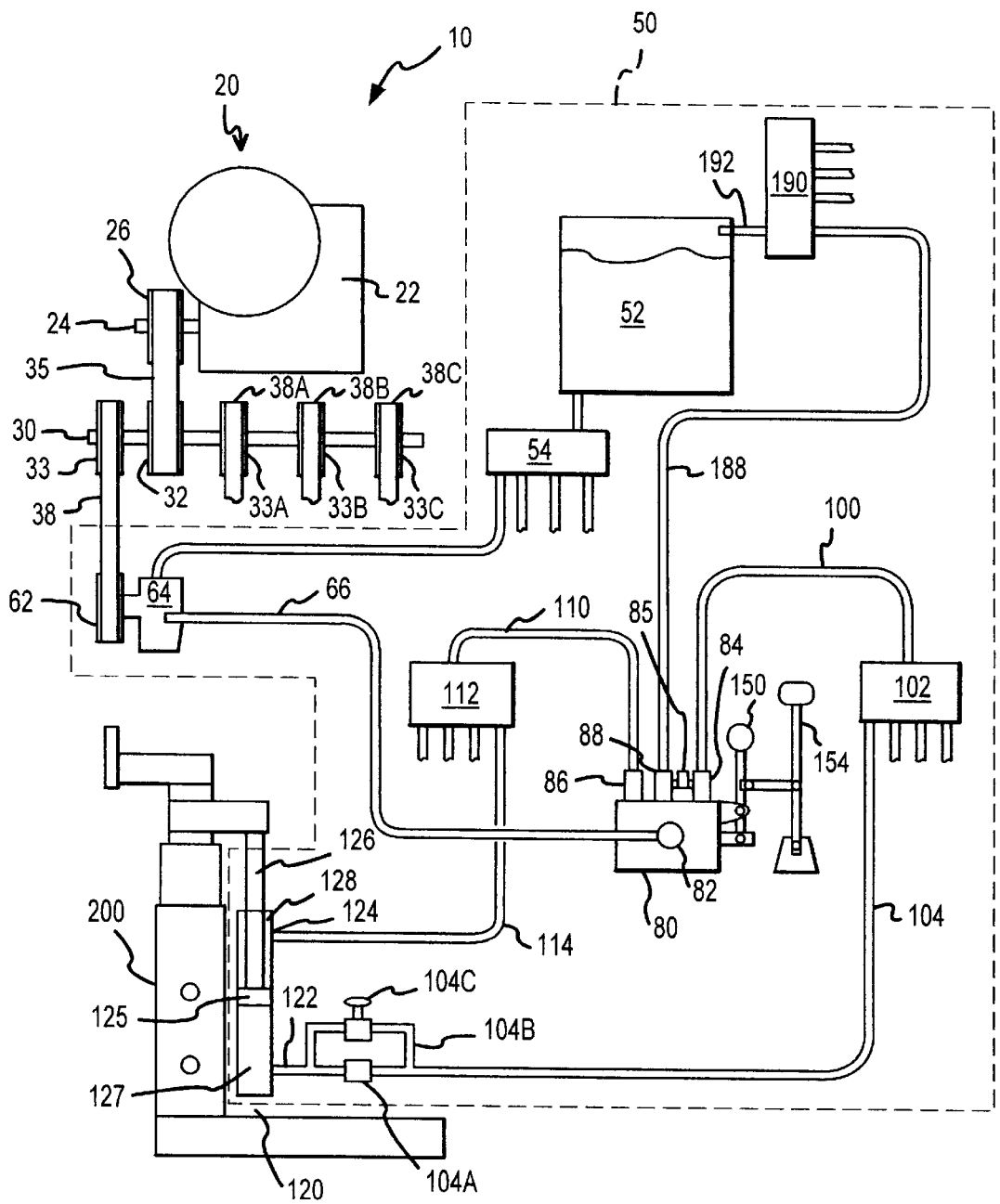
FIG. 1 is a schematic diagram of the hydraulic system portion of the system of the present invention.

The basic purpose of invention lifting system 10 is to raise a structure evenly using a number of hydraulic jacks served by several hydraulic circuits which are in turn powered by one power source. The invention lifting system 10 is schematically illustrated in FIG. 1. Generally, the lifting system 10 includes a drive system 20, hydraulic circuits such as hydraulic circuit 50 and jacks such as jack 200. Generally drive system 20 includes a power source 22, and an arrangement of timing belts and timing pulleys for driving, at the same rate, a set of four hydraulic pumps identical to positive displacement hydraulic pump 64. Hydraulic circuit 50 shown in FIG. 1 and its duplicate, hydraulic circuit 50A shown in FIG. 1A and two other companion hydraulic circuits (not shown) are powered by identical positive displacement pumps 64 and 64A respectively and two other identical companion pumps (not shown). Drive system 20 drives all four of these pumps.

Figure 1A:
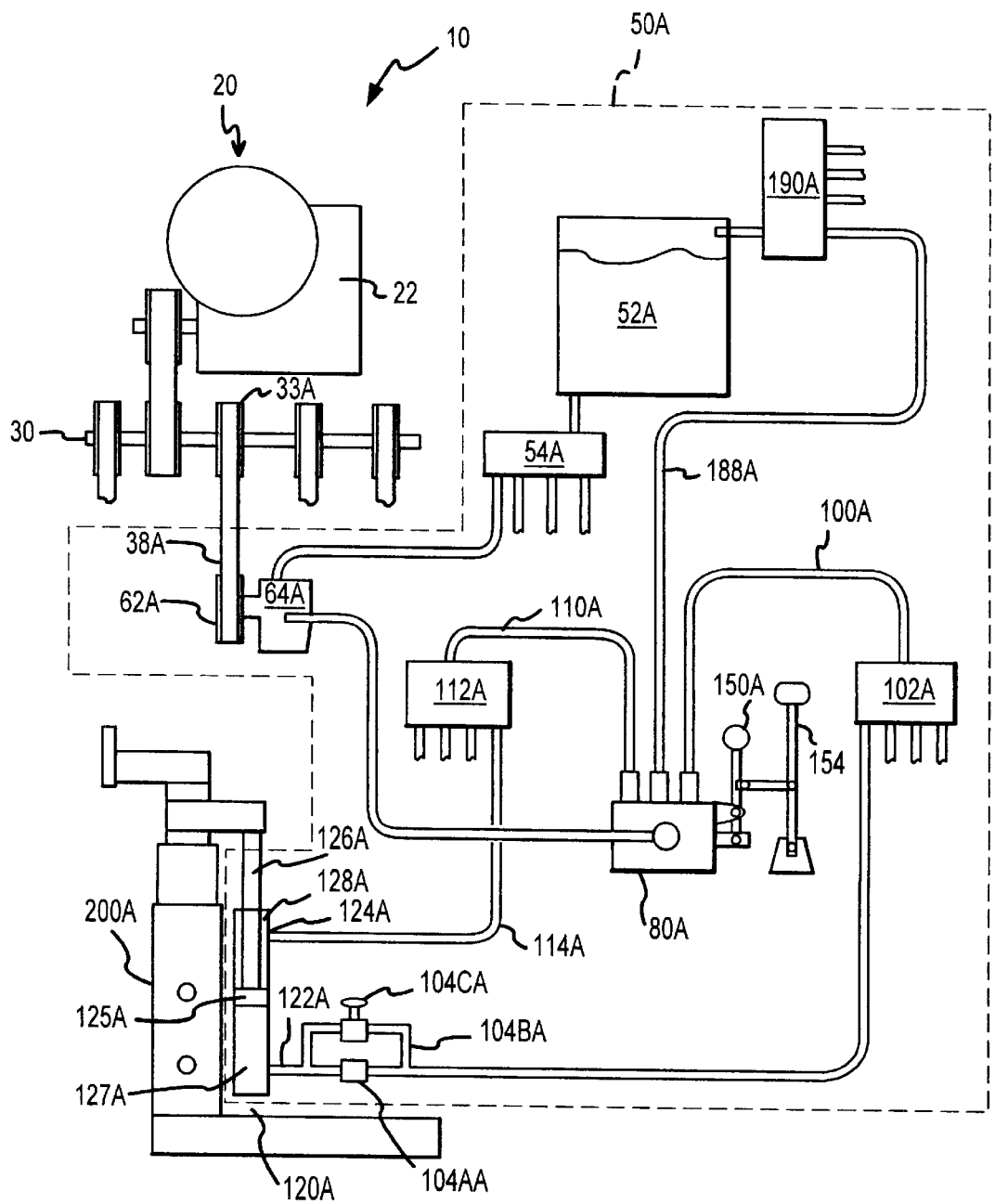
FIG. 1A is a schematic diagram of the hydraulic system portion of the system of the present invention showing a second of four hydraulic circuits.

Hydraulic circuit 50 shown in FIG. 1 includes a reservoir 52, pump 64, an hydraulic cylinder 120 for driving jack 200 and a control valve 80. As will be described in greater detail below, control valve 80 is used to control the flow motivated by pump 64 between reservoir 52 and jack 200. Because of flow splitters 102 and 112, hydraulic circuit 50 as shown in FIG. 1 (and hydraulic circuit 50A as shown in FIG. 1A) is capable of driving up to four jacks identical to jack 200. Since drive system 20 is capable of driving four pumps that serve four hydraulic circuits and since each hydraulic circuit is capable of driving four jacks, the system illustrated in FIG. 1 and FIG. 1A is capable of operating, in unison up to 16 jacks. With additional flow splitters, each circuit could serve up to 16 jacks to provide a system with 64 jacks that operate in unison.

DRIVE SYSTEM

Drive system 20 includes power source 22 which powers a drive shaft 24 and turns a primary drive pulley 26. Power source 22 could be an internal combustion engine, an electric motor or any other form of motive power source. Pulley shaft 30 carries a secondary drive pulley 32 and pump drive pulleys 33, 33A, 33B and 33C. A primary drive belt 35 runs between primary drive pulley 26 and secondary drive pulley 32. Primary drive belt 35 can be a timing belt and primary drive pulley 26 and secondary drive pulley 32 could be timing pulleys so that power can be transferred between power source 20 and pulley shaft 30 without slippage. A pump drive belt 38 runs between pump drive pulley 33 and a pump pulley 62 that is mounted to positive displacement pump 64. Pump 64 and how it relates to the hydraulic system will be discussed in detail below. Pump drive belts 38A, 38B and 38C connect to other pump pulleys identical to pump pulley 62 mounted to pumps identical to pump 64. FIG. 1A illustrates a second identical hydraulic circuit 50A that shares some components with hydraulic system 50. In FIG. 1A pump drive belt 38A transfers power from pulley shaft 30 and pump pulley 33A to pump pulley 62A and pump 64A. It is important that all of the pump drive belts 38, 38A, 38B and 38C are timing belts and that all of the pulleys 33, 33A, 33B, and 33C as well as pump pulley 62, 62A and the other pump pulleys identical to pump pulley 62 and 62A are timing pulleys. These timing belts and timing pulleys transfer power without slipping so that pump 64 and its companion pumps such as pump 64A shown in FIG. 1A turn at the same rate. If these identical pumps do not turn at the same rate, the lifting system will not lift in an uniform manner.

HYDRAULIC CIRCUIT

Hydraulic system 50 as shown in FIG. 1, generally includes reservoir 52, hydraulic pump 64, control valve 80 and hydraulic cylinder 120. Hydraulic cylinder 120 includes a piston 125 that drives a piston rod 126 that slidably extends through a seal in the wall of cylinder 120. Piston rod 126 acts as a lifting member as it pushes up on the movable portion of jack 200. Cylinder 120 includes an lower chamber 127 fed by a lift port 122 and an upper chamber 128 fed by a descent port 124. When hydraulic fluid enters lower chamber 127 through lift port 122, piston 125 and piston rod 126 rise as fluid is pushed out of upper chamber 128 through descent port 124. Conversely, when hydraulic fluid enters upper chamber 128 through descent port 124, piston 125 and piston rod 126 lower as fluid is pushed out of lower chamber 127 through lift port 122.

At the center of hydraulic system 50 is control valve 80. Control valve 80 controls the flow of hydraulic fluid between pump 64, at least one hydraulic cylinder 120 and reservoir 52. Control valve 80 is preferably a center neutral valve that includes an intake port 82, a first port 84, a second port 86 and a return port 88. Line 66, connecting pump 64 and intake port 82 conveys hydraulic fluid from pump 64 to control valve 80. Line 100 transfers fluid from first port 84 to a flow splitter 102 which is connected by line 104 to lift port 122 leading to lower chamber 127 of hydraulic cylinder 120. Similarly, line 110 transfers fluid from second port 84 to a flow splitter 112 which is connected by line 114 to lift port 124 leading to upper chamber 128 of hydraulic cylinder 120. Line 188 conveys hydraulic fluid from return port 88 of control valve 80 to manifold 190 which is connected by line 192 to reservoir 52. A control lever 92 which normally rests in a neutral position is used to move the valve between a neutral, a lift and a descend position.

The three positions of control valve 80 are: a first, neutral position that directs hydraulic fluid from pump 64 back to reservoir 52, a second, lift position that directs fluid from the pump toward lower chamber 127 of hydraulic cylinder 120 and also directs fluid from upper chamber 128 back toward reservoir 52 and a third, descend position that directs fluid from the pump toward upper chamber 128 of hydraulic cylinder 120 and also directs fluid from lower chamber 127 back toward reservoir 52.

When control valve 80 is in the neutral position, fluid in line 66, control valve 80, control valve return port 88 and line 188 leading to reservoir 52 are in open communication so that fluid coming from pump 64 pushes fluid into reservoir 52. When control valve 80 is in this neutral position, no movement of fluid can occur in hydraulic cylinder 120 or the lines connecting hydraulic cylinder to control valve 80. Because hydraulic fluid can not be compressed, when control valve 80 is in the neutral position, fluid in the remainder of the circuit is blocked from moving. This prevents piston rod 126 and piston 125 of the hydraulic cylinders 120 from moving.

When control valve 80 is in the second, lift position, fluid in line 66, valve 80, first port 84 of valve 80, line 100, flow splitter 102, line 104 one way valve 104A, lift port 122 and lower chamber 127 of hydraulic cylinder 120 are all in open communication so that fluid from pump 64 pushes fluid into lower chamber 127 of hydraulic cylinder 120. As fluid enters lower chamber 127 of hydraulic cylinder 120, piston 125 and piston rod 126 are raised causing fluid in upper chamber 128 to exit through descent port 124. When fluid exits descent port 124 of hydraulic cylinder 120, a second column of hydraulic fluid passing though return through line 114, flow splitter 112, line 110, second port 86 of control valve 80, control valve 80, control valve return port 88 and line 188 is pushed toward reservoir 52 causing fluid to flow back into reservoir 52. Control valve 80 should have an adjustable pressure relief valve 85 which is set to bleed from fluid from lift port 122 to return port 86 if the pressure in lift port 122 exceeds a predetermined level. Such a pressure relief valve will prevent hydraulic cylinder 120 or jack 200 from being overloaded.

When control valve 80 is in the third, descend position, fluid in line 66, valve 80, second port 86 of valve 80, line 110, flow splitter 112, line 114 one way descent port 124 and upper chamber 128 of hydraulic cylinder 120 are all in open communication so that fluid from pump 64 pushes fluid into upper chamber 128 of hydraulic cylinder 120. As fluid enters upper chamber 128 of hydraulic cylinder 120, piston 125 and piston rod 126 lower causing fluid in lower chamber 127 to exit from lower chamber 127 through lift port 122. When fluid exits lift port 122 of hydraulic cylinder 120, a second column of hydraulic fluid passing though return through line 104, flow splitter 102, line 100, first port 84 of control valve 80, control valve 80, control valve return port 88 and line 188 is pushed toward reservoir 52 causing fluid to flow back into reservoir 52. In order to control the rate of descent of piston 125 and piston rod 126 under a heavy load, one way valve 104A, bypass branch 104B and needle valve 104C should be added to line 104. One way valve 104A only allows flow toward the hydraulic cylinder. Needle valve 104C in bypass branch 104B is used to restrict and control the flow of hydraulic fluid from lower chamber 127 back to control valve 80.

A lever 150 is used to manipulate control valve 80 and a gang lever 152 can be connected to more than one lever such as lever 150 so that a set of control valves such as control valve 80 can be operated in unison so that sets of jacks can be operated in unison. Although only one jack 200 is shown being operated by circuit 50 shown in FIG. 1, flow splitters 102 and 112 can be used to connect a circuit to operate a set of jacks comprising more than one jack. With still more flow splitters, branching from flow splitters 102 and 112 many more jacks can be served by one circuit 50. The inventor has used circuit 50 to operate as many as 16 jacks.

FIG. 1A illustrates a second identical hydraulic circuit driven by a second pump 64A and controlled by a second control valve 80A. Because pump 64A is identical to pump 64 and is being driven at the same rate as pump 64, identical control valve 80A will deliver the same amount of hydraulic fluid to cylinder 120A as is delivered to cylinder 120 shown in FIG. 1. If cylinder 120A is identical to cylinder 120, it will move the same distance as cylinder 120. It is important that each of the circuits serve a set of jacks having equal numbers of jacks. If, for example when using identical hydraulic cylinders and identical pumps driven at the same rate, a first circuit serves one cylinder and a second circuit serves two cylinders, then the jacks served by the first circuit will move at twice the rate as the jacks served by the second circuit. This would defeat an important purpose of the invention.

A set of more than one jack served by one hydraulic circuit will work best if the jacks are located together. Jacks in a set served by one circuit tend to equalize when they encounter different loads. If they are placed together, the jacks will tend to move at almost exactly the same rate even if they are lifting slightly different loads. This is especially true if a uniform structure such as a grain bin is being lifted. Accordingly, when a uniform structure such as a grain bin is being constructed, it is not necessary to provide an extremely complex, elaborate system that is constrained to provide absolutely identical lifting rates at every point of the structure. The present invention is optimized to provide a very uniform lifting rate for a large uniform structure with a minimum of equipment.

LIFTING JACKS

Figure 2:
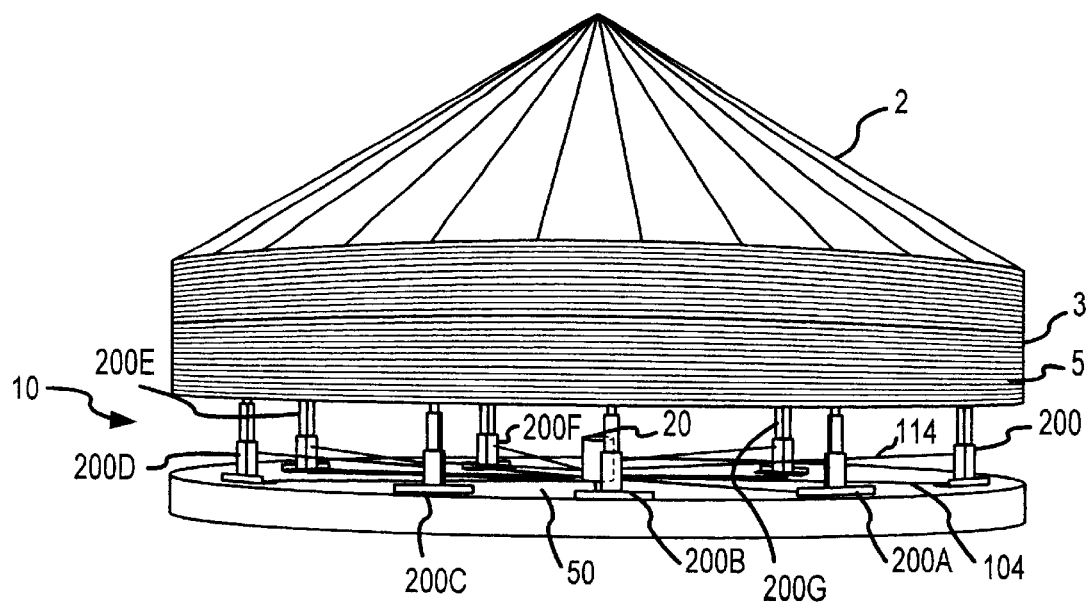
FIG. 2 is a perspective view of the system of the present invention being used to raise a grain bin.

FIG. 1 and FIG. 1A each show only one jack for clarity. As stated above, each hydraulic circuit shown in FIG. 1 and FIG. 1A can support up to four or even sixteen jacks. The purpose of the lifting system of the present invention is to operate a number of jacks in unison so that structure such as a grain bin can be raised and constructed successively by adding one ring or layer at a time. In FIG. 2, jack 200 is shown in an extended position and in relation to a curved grain bin panel 5. In FIG. 2, jack 200 is shown in relation to panel 5 which is part of a circular ring 3. In FIG. 2, jacks 200A, 200B, 200C, 200D, 200E, 200F and 200G are shown supporting the remainder of circular ring 3 that is part of a grain bin 2. After circular ring 3 has been raised by the simultaneous operation of jacks 200 through 200G, a next ring (not shown) can be attached underneath to support ring 3. After the jacks have been detached from ring 3 and retracted, they can be mounted to the next ring and operated to lift the next ring as well as previous ring 3. These steps are repeated to add more rings of panels until the grain bin has been constructed.

Figure 3:
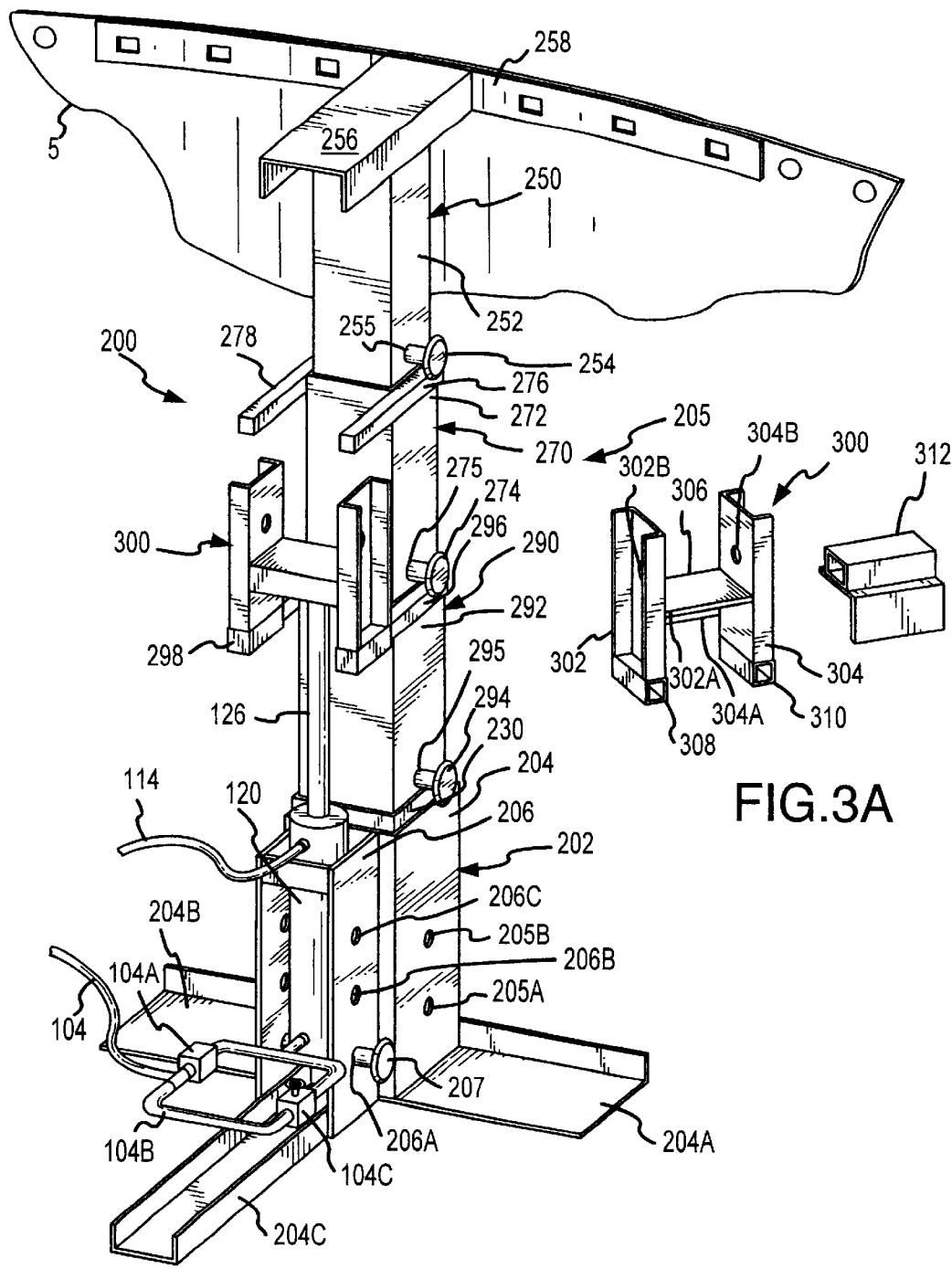
FIG. 3 is a perspective view of jack used in the system of the present invention.

Much as a grain bin may be raised in the above described stepwise fashion, so too is each of the jacks shown in FIG. 2 operated in a stepwise fashion as telescoping masts are successively raised by the operation of the hydraulic cylinders driving each jack. FIG. 3 provides a detailed illustration of jack 200. As is shown in FIG. 3, jack 200 includes a stationary base 202 that supports the jack and a movable, telescoping portion 205. Stationary base 202 includes a base mast 204, a height adjusting mast 230, legs 204A, 204B and 204C as well as cylinder bay 206 for holding hydraulic cylinder 120. The movable, telescoping portion 205 includes a first stage one mast 250, a next stage two mast 270 and a last stage three mast 290. Although, this preferred embodiment has three telescoping masts, a larger number or smaller number of telescoping masts can be used.

Stage one mast 250 includes a body 252, a pin 254, a hole 255 in body 252, a channel 256 and a bracket 258. Hole 255 in body 252 as well as a corresponding opposite hole in body 252 (not shown) and pin 254 that inserts into these opposite holes combine to provide a feature for holding stage one mast 250 in an extended position relative to stage two mast 270. Channel 254 is a fixed feature for receiving or catching the top end of piston rod 126 when stage one mast 250 is being lifted. Bracket 288, like channel 254 is fixed to body 252 and has a series of holes for attachment to grain bin panel 5.

Stage two mast 270 also includes a body 272, a pin 274, a hole 275 in body 272 and prongs 276 and 278. Body 272 of stage two mast 270 is sized to slidably receive body 252 of stage one mast 250. Also as with the stage one mast 250 hole 275 in body 272 as well as a corresponding opposite hole in body 272 (not shown) and pin 274 that inserts into these opposite holes combine to provide a feature for holding stage two mast 270 in an extended position relative to stage three mast 290. Prongs 276 and 278 provide a way to attach a lifting bracket 300 which will be described in greater detail below. The combination of prongs 276 and 278 and lifting bracket 300 provide a removable feature for receiving or catching the top end of piston rod 126 when stage two mast 270 is being lifted.

As with the previous stage two mast 270 and stage one mast 250, stage three mast 290 includes a body 292, a pin 294, a hole 295 in body 292 and prongs 296 and 298. Body 292 of stage three mast 290 is also sized to slidably receive body 272 of stage two mast 270. Again, as with the previous two masts, hole 295 in body 292 as well as a corresponding opposite hole in body 292 (not shown) and pin 294 that inserts into these opposite holes combine to provide a feature for holding stage three mast 290 in an extended position relative to height adjusting mast 230. Prongs 296 and 298 provide a way to attach a lifting bracket 300.

FIG. 3A provides a close up view of lifting bracket 300. It includes vertical members 302 and 304, horizontal member 306 and prong sleeves 308 and 310. As is shown in FIG. 3, lifting bracket 300 can be mounted to prongs 276 and 278 of stage two mast 270 or to prongs 296 and 298 of stage three mast 290. Accordingly, bracket 300 provide a removable feature for receiving or catching the top end of piston rod 126 when stage two mast 270 is being lifted. As can be seen in FIG. 3A, a secondary lifting bracket 312 can be pinned to lifting bracket 300 using holes 302A and 302B to provide second feature for receiving piston rod 126 to provide further adjustment. Holes 302B and 304B in lifting bracket can be used to pin secondary lifting bracket 312 when it is not in use.

As stated above, base 202 includes a base mast 204, a height adjusting mast 230, legs 204A, 204B and 204C as well as cylinder bay 206 for holding hydraulic cylinder 120. Base mast has two pairs of opposite holes: hole 205A and its opposite hole (not shown) and hole 205B and its opposite hole (not shown). Height adjusting mast 230 slides within base mast 203 and may be set at three levels: a first level where it rests at the bottom of base mast 203, a second level where it is supported by a pin inserted through hole 205A and its opposite hole and a third level where it is supported by a pin inserted through hole 205B and its opposite hole. In a similar fashion, cylinder bay 206 has three pairs of opposite holes: hole 206A and its opposite hole (not shown), hole 206B and its opposite hole (not shown) and hole 206C and its opposite hole (not shown). Pin 207 can be inserted into one of these three pairs of holes to support hydraulic cylinder 120 at one of three different levels. The adjustments provided by height adjusting mast 230 and cylinder bay 206 allow jack 200 to be adjusted for use with three standard panel widths that are commonly used to build circular grain bins. Other adjustable support approaches could be used for adjustably supporting hydraulic cylinder 120 and height adjusting mast 230 to accommodate a range of standard lift operations. For example, adjustable mechanisms such as a scissors jacks could be used to adjustably support supporting hydraulic cylinder 120 and height adjusting mast 230 to accommodate a range of lift operations.

Because jack 200 can be operated in three stages, by lifting first stage mast 250, then second stage mast 270 and finally third stage mast 290, jack 200 can lift a load by a distance that is much greater than the stroke distance of hydraulic cylinder 120. Because using a set of jacks like jack 200 driven in unison by the hydraulic system described above involve repetitive, simple operations, a relatively small crew of workers or even one worker can quickly perform operations as a structure is being lifted.

OPERATION OF LIFTING SYSTEM

To understand the operation of lifting system 10, the flow of hydraulic fluid can be traced to a single jack such as jack 200 shown in FIG. 1. The system has three basic modes, a neutral mode, a lifting mode for causing the jacks to lift and a descent mode for causing the jacks to descend. When the system is in the neutral mode, positive displacement pump 64 supplies hydraulic fluid through line 66 to valve 80. When valve 80 is in the center, first, neutral position as it is when the system is in the neutral mode, hydraulic fluid merely passes through valve 80 and is returned via return line 188 to reservoir 52 as described above. If the system is moved from the neutral mode to the lifting mode by moving valve 80 to the second, lift position, hydraulic fluid is supplied to lower chamber 127 of hydraulic cylinder 120 causing piston rod 126 to raise jack 200 as described above. Similarly, when the system is moved from the neutral mode to the descent mode, the system pushes hydraulic fluid to upper chamber 128 of the hydraulic cylinder 120 to lower jack 200 as described above.

By using lifting system 10, a fairly large number of Jacks can be operated in unison by following a simple repetitive process. With the additional flow splitters, the lifting system of the present invention can even be used to operate at least as many as 64 jacks to uniformly lift a very large structure. The operation of a single lifting jack 200 to lift a panel and by extension a ring segment by operation of a number of jacks follows a simple repetitive process including the following steps: (1) Mount hydraulic cylinder 120 in hydraulic cylinder bay 206 at a predetermined level by placing hydraulic cylinder 120 on top of pin 207 after pin 207 has been inserted into one of the cylinder support pin holes 206A, 206B and 206C. (2) Support height adjusting mast 230 either by resting it in the floor of base 202 or supporting it by a pin inserted either in hole 205A or 205B. (3) Select the first support alternative from step 1 and the first support alternative from step 2 to attach a relatively short panel 5 to lifting bracket 258 or select the second support alternative from step 1 and the second support alternative from step 2 to attach a medium height panel 5 to lifting bracket 258 or select the third support alternative from step 1 and the third support alternative from step 2 to attach a relatively tall panel 5 to lifting bracket 258. (4) Run hydraulic system 50 with valve 80 in the second, lift position so that cylinder rod 126 engages channel 256 and lifts first stage mast 252 and panel 5 until hole 255 appears above lifting arm second stage mast 270. (5) Run hydraulic system 50 with valve 80 in the first, neutral position and insert pin 254 into hole 255 to secure first stage mast 250 relative to second stage mast 270. (6) Retract cylinder rod 126 by running hydraulic system 50 while valve 80 is in the third, descent mode by while leaving valve 104C completely open. (7) Place lifting bracket 300 on lifting prongs 276 and 278. (8) Raise panel 5 yet further by running hydraulic system 50 with valve 80 in the second, lift mode while piston rod 126 pushes on lifting bracket 300 to raise second stage mast 270 until hole 275 completely appears above third stage mast 290. (9) Shift hydraulic system 50 into the neutral mode and insert pin 274 into hole 275 to secure second stage mast 270 relative to third stage mast 290. (10) Retract cylinder rod 126 by again running hydraulic system 50 with valve 80 in the descent position as described in step 6. (11) Remove lifting bracket from prongs 276 and 278 and place lifting bracket 300 on lifting prongs 296 and 298. (12) Raise panel 5 yet even further by running hydraulic system 50 with valve 80 in the ascent position while piston rod 126 pushes on lifting bracket 300 to raise second stage mast 290 until hole 295 completely appears above height adjusting mast 230. (13) Insert pin 294 into completely exposed hole 295 to secure third stage mast 290 relative to height adjusting mast 230 and by extension to secure jack 200 and panel 5 in a completely extended and lifted position. If the completely extended position of step 13 raises panel 5 too high to be supported by a second panel attached to panel 5 from below, then it may be necessary to only partially extend third stage mast 290 and then hold third stage mast 290 in position by running hydraulic system 50 with valve 80 in the first, neutral position while a second panel is attached to panel 5 from below.

If the above steps are repeated with a number of jacks supporting a ring of interconnected panels like panel 5, then when interconnected control valves are operated in unison, the ring can be lifted in a progressive uniform fashion until a second ring of panels can be attached to support first ring from below. All of the jacks can then be disconnected from the first ring once the first ring is supported by a second ring. Then for each jack a reverse process can be followed to return the all of the jacks to a position for lifting the second panel. This reverse process would include the following steps: (1) piston rod 126 is completely lowered by running the hydraulic circuit serving it with its control valve in the third, descent position, (2) first stage mast 250 is retracted by removing pin 254, (2) second stage mast 270 is retracted by removing pin 274 and then (3) third stage mast 290 is retracted by removing pin 294. Bracket 258 of first stage mast 250 can now be mounted to a second panel in a second ring of panels. The above described lifting process is then repeated for all of the jacks in relation to the second ring of panels to make room for yet a third ring of panels that can then be attached to the second ring. As additional rings of panels are attached and raised, an entire structure can be progressively assembled. The first lifting operation can also be used to raise a first ring and a roof structure so that a complete structure having a roof can be progressively raised.

Of course the system grain bin lifting system 10 of the present invention need not be confined to constructing grain bins, but could be used with slight modifications to raise all types of structures and could be employed to do so with significant reductions in labor. The combination of lifting system 10 and jack 200 provides a highly effective means for constructing large, heavy structures with an absolute minimum of time and labor.

The invention has been described above in considerable detail in order to comply with the patent laws by providing a full public disclosure of at least one of its embodiments. However, such a detailed description is not intended in any way to limit the broad features of principles of the invention, or the scope of patent monopoly to be granted. The skilled reader in view of this specification may envision numerous other modifications and variations of the above disclosed embodiments. Accordingly, the reader should understand that these modifications and variations and the equivalence thereof, are within the spirit and scope of this invention as defined by the following claims wherein.

I claim:

1. A method for progressively building a structure having levels comprising the following steps:
    (a) obtaining a set of hydraulic jacks and a hydraulic system comprising,
        (i) at least two substantially identical positive displacement hydraulic pumps, each of the at least two hydraulic pumps for supplying substantially equal amounts of hydraulic fluid when driven at the same rate,
        (ii) a power source for simultaneously driving the pumps at the same rate,
        (iii) at least two sets of substantially identical telescoping jacks actuated by substantially identical hydraulic cylinders, each set of telescoping jacks having equal numbers of telescoping jacks including at least one telescoping jack, each telescoping jack comprising a base that supports the jack, the hydraulic cylinder of each telescoping jack mounted to the base and having a vertically extending and retracting piston rod capable of translation by a maximum stroke distance, each telescoping jack also including a series of telescoping masts mounted to the base including at least two masts, including a first mast and a last mast, the last mast mounted in relation to the base so that it can move vertically in relation to the base and the first mast mounted to the last mast so that it that can move vertically in relation to the first mast, the first mast having an attachment for attaching to a portion of the structure, a member for engaging the top end of the piston rod and a feature for locking its position to at least prevent downward movement thereof relative to the last mast, the last mast also having a member for engaging the top end of the piston rod and a feature for locking its position relative to the base to at least prevent downward movement thereof relative to the base, the first mast and its attachment bracket capable of being lifted by a distance greater than the hydraulic cylinder piston rod stroke distance if the first mast is lifted by a distance substantially corresponding to the hydraulic cylinder piston rod stroke distance and locked in relation to the last mast which is then lifted by the hydraulic cylinder in relation to the base,
        (iv) at least two control valves that can be operated in unison for controlling the flow of hydraulic fluid that flows between each of the at least two pumps and each of the at least two sets of jacks, each of the at least two control valves hydraulically connected by hydraulic lines to one of the pumps and the hydraulic cylinders of one of the sets of jacks, each of the at least two control valves operable in at least two modes: a first mode for directing the flow of hydraulic fluid from the pump away from the hydraulic cylinders of a set of jacks so that the jacks do not raise and a second mode for directing the flow of hydraulic fluid from the pump toward the hydraulic cylinders of a set of jacks to cause the jacks to raise, (b) mounting the attachment of each first mast of each hydraulic jack of each set of jacks to a portion of a first level of the structure, (c) engaging the piston rods of each hydraulic cylinder with each first mast of each jack, (d) actuating the control valves of the hydraulic system in the second mode to provide the hydraulic cylinders of each set of jacks with the same amount of flow of hydraulic fluid so that all of the first masts of all of the hydraulic jacks extend relative to all of the next masts of all of the hydraulic jacks at the same rate to uniformly lift the structure by a distance no more than the same distance as the stroke distance of the hydraulic cylinders, (e) securing each mast in relation to each next mast, (f) retracting each piston rod of each of the hydraulic cylinders, (g) engaging the piston rods of each hydraulic cylinder with each next mast, (h) repeating steps (d) through (g) until a next level of the structure can be added under the jack supported level to support the jack supported level, (i) disconnecting the jacks from the level they are supporting, (j) retracting all of the cylinders, (k) retracting each mast relative to each next mast by unsecuring each mast relative to each next mast, (l) connecting each of the jacks of the sets of jacks to the next level, (m) repeating steps (b) through (l) for each next level and steps (b) through (i) for the last level until all of the levels of the structure have been erected.

2. The method of claim one wherein, (a) the hydraulic system further comprises an hydraulic fluid reservoir, hydraulic lines connecting the hydraulic fluid reservoir with the pumps, and, hydraulic lines connecting the hydraulic fluid reservoir with control valves so that fluid directed by a control valve away from the hydraulic cylinders of a set of jacks may flow into the hydraulic fluid reservoir and so that fluid pumped by a pumps to control valve may be drawn out of the hydraulic fluid reservoir.

3. The method of claim 1 wherein, the base of each telescoping jack in the set of jacks includes a fixed base mast and the telescoping masts include a third stage mast that can move relative to the base mast, a second stage mast that can move relative to the third stage mast and a first stage mast that can move relative to the second stage mast, the first stage mast having an attachment for attaching to a portion of the structure, a fixed member for engaging the top end of the hydraulic cylinder piston rod and features for locking in an extended position relative to the second stage mast, the second stage mast having at least one member for receiving a removable bracket for engaging the top end of the hydraulic cylinder piston rod and features for locking in an extended position relative to the third stage mast and the third stage mast also having at least one member for receiving a removable bracket for engaging the top end of the hydraulic cylinder piston rod as well as features for locking in an extended position relative to the base mast.

4. The method of claim 1 wherein, the base of each telescoping jack of the sets of jacks includes a fixed base mast and the telescoping masts include a height adjusting mast that is adjustably movable in relation to the base mast, a third stage mast that can move relative to the height adjusting mast, a second stage mast that can move relative to the third stage mast and a first stage mast that can move relative to the second stage mast, the first stage mast having an attachment for attaching to a portion of the structure, a member for engaging the top end of the hydraulic cylinder piston rod and features for locking in an extended position relative to the second stage mast, the second stage mast having at least one member for receiving a removable bracket for engaging the top end of the hydraulic cylinder piston rod and features for locking in an extended position relative to the third stage mast, the third stage mast also having at least one member for receiving a removable bracket for engaging the top end of the hydraulic cylinder piston rod as well as features for locking in an extended position relative to the height adjusting mast and the height adjusting mast having features for locking its vertical position relative to the base mast.

5. The method of claim 1 wherein, (a) the base of each telescoping jack of the set of jacks includes a fixed base mast and the telescoping masts include a height adjusting mast that is adjustably movable in relation to the base mast, a third stage mast that can move relative to the height adjusting mast, a second stage mast that can move relative to the third stage mast and a first stage mast that can move relative to the second stage mast, the first stage mast having an attachment for attaching to a portion of the structure, a member for engaging the top end of the hydraulic cylinder piston rod and features for locking in an extended position relative to the second stage mast, the second stage mast having at least one member for receiving a removable bracket for engaging the top end of the hydraulic cylinder piston rod and features for locking in an extended position relative to the third stage mast, the third stage mast also having at least one member for receiving a removable bracket for engaging the top end of the hydraulic cylinder piston rod as well as features for locking in an extended position relative to the height adjusting mast and the height adjusting mast having features for locking its vertical position relative to the base mast, and wherein, (b) the hydraulic cylinder of each of the jacks is adjustably mounted to the base for vertical adjustment of the hydraulic cylinder, whereby the jack may be adjusted for lifting structural elements having a standard height by a distance so that upon a final extension of the piston of the hydraulic cylinder the height of a standard structural element height may be reached.

* * * * *